United States Patent [19]

Hartung et al.

[11] Patent Number: 5,968,655
[45] Date of Patent: Oct. 19, 1999

[54] FILLER COMPONENT FOR USE IN AQUEOUS BASECOATS

[75] Inventors: Michael Hartung, Geseke; Frank Leibfarth, Metzingen; Andreas Göbel, Köln; Hans-Josef Oslowski, Münster, all of Germany

[73] Assignee: BASF Coatings AG, Muenster-Hiltrup, Germany

[21] Appl. No.: 08/836,597

[22] PCT Filed: Oct. 19, 1995

[86] PCT No.: PCT/EP95/04106

§ 371 Date: Jun. 20, 1997

§ 102(e) Date: Jun. 20, 1997

[87] PCT Pub. No.: WO96/12769

PCT Pub. Date: May 2, 1996

[30] Foreign Application Priority Data

Oct. 22, 1994 [DE] Germany .................. 44 37 841

[51] Int. Cl.$^6$ .................. B05D 1/36; B05D 3/02; B05D 7/16; B05D 7/18
[52] U.S. Cl. .................. 428/423.1; 427/407.1; 427/409; 427/412.1; 427/412.3; 427/412.5
[58] Field of Search .................. 427/407.1, 409, 427/412.1, 411.3, 412.5, 388; 428/423.1, 423.3, 423.5, 423.7, 424.8

[56] References Cited

U.S. PATENT DOCUMENTS

| | | | |
|---|---|---|---|
| 4,615,940 | 10/1986 | Panush et al. | 427/407.1 |
| 5,047,294 | 9/1991 | Schwab et al. | 427/388.4 |
| 5,120,415 | 6/1992 | Yuan | 204/181.1 |
| 5,147,927 | 9/1992 | Baghdachi et al. | 524/710 |
| 5,241,001 | 8/1993 | Kania et al. | 525/111 |
| 5,288,520 | 2/1994 | Toyaoshima et al. | 427/322 |
| 5,468,518 | 11/1995 | Lein et al. | 427/421 |
| 5,589,228 | 12/1996 | Wegner et al. | 427/409 |
| 5,612,095 | 3/1997 | Brock et al. | 427/409 |
| 5,633,037 | 5/1997 | Mayer | 427/409 |
| 5,700,522 | 12/1997 | Nonweiler et al. | 427/388.4 |
| 5,709,909 | 1/1998 | Leibfarth et al. | 427/407.1 |

FOREIGN PATENT DOCUMENTS

| | | |
|---|---|---|
| 0 228 003 A1 | 12/1986 | European Pat. Off. . |
| 0 255 078 A2 | 7/1987 | European Pat. Off. . |
| A-0 311 209 | 4/1989 | European Pat. Off. . |
| 0 438 090 A1 | 1/1991 | European Pat. Off. . |
| 0 614 951 A2 | 3/1994 | European Pat. Off. . |
| A-23 31 792 | 1/1975 | Germany . |
| 43 28 287 A1 | 8/1993 | Germany . |

OTHER PUBLICATIONS

Derwent Abstract 89–329285/45 of Japenese Patent Document JO 1245–822–A, Oct. 1989.

*Primary Examiner*—Diana Dudash

[57] ABSTRACT

The present invention relates to a process of multi-layer coating using a filler component comprising a1) from 10 to 70% by weight of an aqueous dispersion of a water-dilutable polyurethane resin or of a plurality of water-dilutable polyurethane resins, the content of polyurethane in the aqueous dispersion being from 10 to 60% by weight, preferably from 20 to 50% by weight, a2) from 0 to 30% by weight of one or more amino resins and/or of a blocked polyisocyanate, a3) from 0 to 50% by weight of one or more physically drying binders which are different from a1), a4) from 5 to 40% by weight of one or more fillers and/or extenders, a5) from 0 to 30% by weight of color pigments and/or effect pigments, a6) from 0 to 5% by weight of one or more rheological auxiliaries and/or paint auxiliaries, and a7) from 0 to 10% by weight of organic solvent.

The filler component is used to modify an aqueous basecoat composition, which is applied and followed by application of an aqueous basecoat second layer, a clear coat third layer, and then curing the coating layers together.

21 Claims, No Drawings

FILLER COMPONENT FOR USE IN AQUEOUS BASECOATS

The present invention relates to aqueous filler components for use in aqueous basecoats for coating plastic and metal substrates, to aqueous basecoats comprising such filler pastes and to processes for the direct coating of plastic and metal substrates.

Car bodies, add-on components for the automotive industry and a large number of parts for nonautomotive applications are fabricated from a wide variety of metals and, increasingly, from plastic.

Coatings on plastic must on the one hand exhibit good adhesion to the respective plastics substrate and must on the other hand cover surface defects of the plastics substrates. The direct and therefore primerless coating of aqueous effect basecoats or solid-color basecoats on common plastics substrates presents problems, since without priming beforehand it is not possible to cover surface defects, such as flow lines, for example, to a sufficient extent.

Surface defects on such plastics substrates and on metal substrates, such as grooves, pores, voids or flow lines, are commonly covered by thick-coat primers and/or topcoats. Primer-free basecoats are known from the earlier application DE 4315467.0, which is not a prior publication. However, this system cannot be used for aqueous basecoats. In the case of the application of conventional aqueous solid-color or effect basecoats, where the requirements in terms of optical and other technological properties are high (such as the electrostatic application of the clearcoat), the application beforehand of a primer and/or of a filler is indeed imperative. A direct, primer-free and/or filler-free coating of aqueous basecoats, given the inhomogeneities in the polar plastic surface or metal surface which result from manufacture, is possible only with a marked reduction in quality.

It is known to employ aqueous basecoats. Aqueous basecoats of this kind can be employed only to a limited extent for the low-temperature drying of plastics. A further disadvantage consists in the inadequate sandability of the coatings which result from aqueous basecoats, an inadequacy which is to be attributed to the fact that the aqueous basecoats generally comprise no mineral fillers.

DE 4107136 describes aqueous basecoats. Their application for the direct coating of plastics surfaces followed by electrostatic application of the subsequent clearcoat is not described.

The object of the present invention was therefore to eliminate the above-described disadvantages of the prior art. The intention was therefore to provide aqueous basecoats for the coating of customary plastics substrates, especially polar plastics substrates, such as polycarbonate, polyamide, polystyrene, styrene copolymers, polyesters, polyphenylene oxides, pretreated, ie. surface-activated, polyolefins, and blends of these and other plastics, reactive resins, for example PUR-RIM, SMC, BMC and the like, and of metal substrates, with which basecoats the direct coating of these substrates is possible; in other words, basecoats which when used would eliminate the need to use primers in the case of plastics substrates or fillers in the case of metal substrates which should be suitable for automotive finishing, with the consequence of a considerable cost saving. The aqueous basecoats should exhibit good adhesion to the substrate and should in particular, despite the absence of a primer, result in good coverage of surface defects such as, for example, grooves and flow lines.

The object is surprisingly achieved by an aqueous filler component as claimed in claim 1, which is employed in basecoats, and, respectively, by aqueous basecoats which are suitable for the direct coating, i.e. primerless coating, of polar plastic substrates and metal substrates.

The present invention accordingly provides a filler component comprising a1) from 10 to 70% by weight, preferably from 40 to 55% by weight, of an aqueous dispersion of a water-dilutable polyurethane resin or of a plurality of water-dilutable polyurethane resins, the solids content of polyurethane in the aqueous dispersion being from 10 to 60% by weight, preferably from 20 to 50% by weight, a2) from 0 to 30% by weight of one or more amino resins and/or of a blocked polyisocyanate, a3) from 0 to 50% by weight, preferably from 0 to 10% by weight, of one or more physically drying binders which are different from a1), a4) from 5 to 40% by weight, preferably from 10 to 30% by weight, of one or more fillers and/or extenders, a5) from 0 to 30% by weight, preferably from 5 to 20% by weight, of color pigments and/or effect pigments, a6) from 0 to 5% by weight, preferably from 0.5 to 2% by weight, of one or more rheological auxiliaries and/or paint auxiliaries, and a7) from 0 to 10% by weight of organic solvents, preferably 3–7% by weight, the sum of the components a1) to a7) being in each case 100% by weight.

In accordance with the present invention, the filler component is employed in basecoats for the direct coating of the abovementioned substrates.

In the text below, the individual constituents of the filler component according to the invention are discussed in more detail.

The filler component comprises from 10 to 70% by weight, preferably from 40 to 55% by weight, of an aqueous polyurethane resin or of a plurality of polyurethane resins a1). In the case where the filler component comprises no crosslinking component a2), these resins are elastic, aromatic and/or aliphatic, branched or linear polyurethane elastomers having a good physical drying capacity and a high specific volume. The polyurethane elastomers can have free hydroxyl groups which are available for crosslinking.

In the case where the filler component comprises a crosslinking component a2), at least one aqueous polyurethane resin dispersion having a sufficiently high hydroxyl number is employed as component a1), i.e. the polyurethane resin dispersion has an OH number in the range from 50 to 500, preferably in the range from 100 to 350, mg of KOH/g. The polyols employed to prepare the hydroxyl-containing polyurethane resin dispersions can be of low molecular weight and/or high molecular weight. As polyol components of relatively high molecular weight, use is made of saturated or unsaturated polyester-polyols and/or poyether-polyols having a molecular mass of from 400 to 5000. The polyester-polyols are prepared by esterifying organic dicarboxylic acids or their anhydrides with organic diols, or are derived from a hydroxycarboxylic acid or a lactone. To prepare branched polyester-polyols, it is possible to use, to a minor extent, polyols or polycarboxylic acids having a higher functionality. The isocyanates used to prepare the polyurethane resins are aliphatic, cycloaliphatic and/or aromatic polyisocyanates having at least two isocyanate groups per molecule. They are preferably the isomers or isomer mixtures of organic diisocyanates. The polyisocyanate component can also include a proportion of polyisocyanates of higher functionality. The average functionality can be lowered if desired by adding monoisocyanates. Examples of suitable polyisocyanates are 1,3-bis(2-isocyanatoprop-2-yl) benzene, phenylene diisocyanates, tolylene diisocyanates, xylylene diisocyante, biphenylene diisocyanate, naphthylene diisocyanate, diphenylmethane diisocyanates, isophorone diisocyanate, cyclopentylene diisocyanate, cyclohexylene diisocyanate, methylcyclohexylene diisocyanate, dicyclohexylmethane diisocyanate, trimethylene diisocyanate, tetramethylene diisocyanate, pentamethylene diisocyanate, hexamethylene diisocyanate, propylene diisocyanate, ethylethylene diisocyanate and trimethylhexane diisocyanate.

The hydroxyl-containing polyurethane resin dispersions can be prepared by simultaneously reacting the polyisocyanate with an excess of polyol. The reaction can also be carried out in stages. The preparation can be carried out, if desired, in the presence of catalysts, such as organotin compounds and/or tertiary amines. The reaction is customarily performed in the presence of organic solvents which contain no active hydrogen according to Zerewitinoff. Dispersion in water is generally carried out by neutralization of the carboxyl groups with amines beforehand. If required, the content of organic solvents can be reduced by vacuum distillation. The aqueous polyurethane dispersions preferably have a solids content of from 10 to 60% by weight, in particular from 20 to 50% by weight. Very particularly preferred values are a solids content of from 20 to 40% by weight and a solvent content of from 2 to 10% by weight.

The filler component according to the invention comprises as component a2) from 0 to 30% by weight of one or more amino resins and/or of a blocked polyisocyanate or of a plurality of blocked polyisocyanates, which can act as crosslinking agents if component a1) comprises appropriate functional groups, for example hydroxyl groups. In the case where the filler component comprises S exclusively physically drying polyurethane resins (component a1)), no amino resin and no blocked isocyanate are used, except in the function of paint additive according to a6). If component a1) contains a polyurethane resin having a sufficient number of crosslinkable hydroxyl groups, the filler component comprises amino resins or blocked polyisocyanates as crosslinking agents.

Typical amino resins are melamine, benzoguanamine and urea-formaldehyde resins. These are preferably used in a form etherified with lower alcohols, usually methanol and/or butanol. Examples of suitable amino resins are those obtainable on the market under the tradenames Cymel, Luwipal, Maprenal and Beetle. Melamine resins are employed with particular preference as component a2).

An example of a suitable amino resin is hexamethoxymethylmelamine.

Of course, it is possible to use not only the condensation products with formaldehyde but also those with other aldehydes.

Typical blocked polyisocyanates are addition products of polyisocyanates, for example of the type hexamethylene diisocyanate or tolylene isocyanate, with suitable blocking agents, such as diethyl malonate, ethyl acetoacetate, hydroxylamine, caprolactam, aryl and alkyl mercaptans, monomethylaniline, acetone oxime, diphenylamine, phenols and α-pyrrolidone. They are available on the market, for example, under the tradename Desmodur. In order to prepare the blocked polyisocyanates it is of course also possible to use NCO prepolymers; these blocked isocyanates are, for example, phenol-blocked polyisocyanates based on tolylene diisocyanate and a triol component.

The crosslinking resins of component a2) are preferentially used if drying temperatures of more than 90° C. are employed. This is the case with the coating of metal substrates, whereas in the coating of plastics substrates low drying temperatures are desirable. In the latter case, the aqueous polyurethane resins employed as component a1) react with the crosslinking agent only to a minor extent. Accordingly, little or no component a2) is used.

As component a3) the filler component according to the invention comprises from 0 to 50% by weight, preferably from 0 to 10% by weight, of one or more physically drying, water-dilutable binders which are different from a1). The term physical drying capacity refers to the fact that the binders, after giving off the organic solvents and water from the paint film in the course of drying, no longer impart tacky properties to the paint film below about 50° C. Binders of this kind are familiar to the person skilled in the art; they are customary binders which are commercially available as base materials for coatings. Examples of suitable physically drying binders are polyester resins, alkyd resins, polyacrylate resins, cellulose derivatives, melamine resins and the like in aqueous form. The physically drying binders of component a3) affect technological properties, such as ease of overpainting and the drying characteristics. The physically drying, water-dilutable binders a3) which are different from component a1) are preferably employed in a proportion of from 0 to 10% by weight.

The filler component according to the invention comprises from 5 to 40% by weight, preferably from 10 to 30% by weight, of one or more fillers and/or extenders (component a4)). Examples of suitable fillers and/or extenders are silicate fillers, for example kaolin (china clay) talc, siliceous chalk, various mica varieties, for example micaceous iron ore, silicon carbide and ground quartz, carbonate fillers, such as chalk and dolomite, and sulfate fillers, such as barium sulfate and calcium sulfate. Component a4) is an essential component of the filler component and results on the one hand in a distinct improvement on the mechano-technological level (for example with respect to stone-chip resistance) while on the other hand achieving an outstanding optical coverage of substrate defects.

It is possible if desired to employ, in the filler component according to the invention, up to 30% by weight of color pigments and/or effect pigments. Examples of suitable inorganic color pigments are white pigments, for example titanium dioxide, lead white, zinc white, black pigments, for example carbon black, colored pigments, for example iron oxide and chromium oxide pigments, and oxidic mixed-phase pigments. Effect pigments which can be employed in the filler component according to the invention are metallic pigments or effect pigments based on mica flakes, as are conventional, for example, in the sector of automotive finishing. It is also possible to use electrically conductive pigments, especially for the coating of plastics substrates. The use of color pigments and effect pigments, including carbon black, is optional and is only practiced where the requirements in terms of accuracy of shade are very high. In most cases, a pale gray paste additive is recommended for light shades and a dark gray additive for dark shades. The pigment/binder ratio in the filler component according to the invention is about 1:0.6–2.0, preferably 1:1.3–1.8, with the term "pigment", in the context of determining the pigment/binder ratio, embracing all inorganic constituents, such as extenders and inorganic rheological auxiliaries, for example.

The filler components according to the invention comprise from 0 to 5% by weight of one or more rheological auxiliaries, examples being waxes, associated thickeners, phyllosilicates, organically modified minerals and the like, and also, if desired, customary paint additives as are familiar to the person skilled in the art and available commercially. The use of the rheological auxiliaries is optional and is practiced in order to meet very high requirements regarding the tenacity of the wet film. The binder/pigment combinations selected and the chosen pigment/binder ratio already ensure a very good tenacity and, consequently, coating thickness. Other suitable auxiliaries, apart from rheological auxiliaries, are customary paint auxiliaries, such as leveling agents, antifoams, etc.

Component a7) of the filler components according to the invention comprises from 3 to 10% by weight of organic solvents. These are customary paint solvents, such as low molecular weight esters, aromatic compounds, glycol esters, glycol ethers, etc., the organic solvents being chosen in particular for compatibility with the aqueous polyurethane dispersion used (component a1)). The use of aliphatic and aromatic diluents, therefore, is possible only to a limited extent. Examples of particularly suitable organic solvents are butylglycol, butyldiglycol and ethers and esters of propylene glycol.

The filler components according to the invention are prepared by predispersing the intended pigments and extenders in a portion of the total binder and then milling this mixture to a sufficient particle fineness. The make-up mixture used comprises the remaining quantity of binder, and also rheological auxiliaries and solvents.

The present invention likewise provides aqueous basecoats for the coating of metal and plastics substrates, the basecoats comprising the filler component according to the invention in a proportion of from 10 to 70% by weight. The filler components are, in accordance with the present invention, added to commercially usual aqueous basecoats (cf. DE 41 07 136) which are suitable for the coating of metal or plastics substrates.

The present invention therefore likewise provides basecoats for the coating of metal and plastics substrates, which basecoats comprise from 10 to 70% by weight of the above-described filler component and from 90 to 30% by weight of a customary basecoat composition comprising one or more binders, with or without rheological auxiliaries, color pigments and/or effect pigments and organic solvents, the overall weight of the basecoats comprising the filler component being 100% by weight. The basecoats preferably consist of from 30 to 60% by weight of the filler component and from 70 to 40% by weight of a customary basecoat composition.

Customary aqueous basecoat compositions which are combined with the filler component according to the invention to give the basecoat according to the invention are those comprising commercially customary base materials, such as water-dilutable polyesters, polyacrylates, polyurethane dispersions, rheological auxiliaries, crosslinking agents and color pigments and/or effect pigments, for example metallic pigments and mica flakes. Customary color pigments are the pigments already mentioned beforehand in the description of component a5) of the filler component. Such basecoats are known to the person skilled in the art and therefore require no further description. A particularly preferred binder for the basecoat composition is a polyurethane dispersion, aqueous polyester solution or melamine resin, to which a silicate-based rheological auxiliary is added.

The basecoats according to the invention which are formed with addition of the filler component can be applied to metal substrates without prior application of a primer and of a filler, or to plastics substrates without priming beforehand, the resulting coatings exhibiting excellent adhesion and giving outstanding coverage of surface defects, especially grooves and flow lines. In the case of heightened requirements regarding prevention of corrosion, as is the case with coated metal substrates for automotive finishing, the basecoat is applied directly, for example to the metal substrate which has been primed by means of electrodeposition coating.

The present invention therefore likewise provides a process for the direct coating of metal and plastics substrates, which comprises applying directly to the substrate the aqueous basecoat comprising the aqueous filler component. Thus the aqueous basecoat according to the invention, in accordance with the present invention, is applied directly to the substrate. In the coating of plastics substrates it is possible, but not absolutely necessary, to subject the substrate to pretreatment (flame treatment, plasma, corona). After short intermediate evaporation, a customary basecoat is then applied which, however, comprises no filler component. The term short intermediate evaporation refers to evaporation, for example, at a temperature between 20 and 50° C. for from 30 seconds to 5 minutes, preferably from 1 to 2 minutes.

Examples of suitable basecoats which are free of filler components are the customary basecoat compositions already described above, which comprise one or more binders, rheological auxiliaries, color pigments and/or effect pigments and organic solvents. After renewed evaporation at temperatures between 20° C. and 90° C., preferably from 30° C. to 80° C., for from 5 to 15 minutes, preferably from 8 to 12 minutes, followed by cooling, the coated metal or plastics substrate is coated over with a customary clearcoat. The coats applied are then cured together, with heating.

The clearcoats used are customary, commercially available, weather-resistant clearcoats. Suitable examples thereof are isocyanate-curing two-component clearcoats based on polyester resins or acrylic resins, and autocrosslinking 1-component clearcoats which are based on polyester resin or polyacrylate resin and are suitable for the high-temperature drying of metals. Such paint systems are common and are known to the person skilled in the art. Examples are described in the document "Produkte für die Lackindustrie" [Products for the paint industry], Volume 2, Desmodur/Desmophen from Bayer, and in Houben Weyl "Methoden der Organischen Chemie", [Methods of organic chemistry], Volume 4/2, macromolecular substances, page 57, polyurethanes, edited by E. Müller.

The basecoat containing the filler component is applied so as to result in a dry film thickness in the range from 10 to 20 μm. The basecoat which is free of filler components and is applied after short intermediate evaporation is customarily applied in a dry film thickness of from 70 to 10 μm.

The process described above is particularly suitable for the coating of plastics add-on parts in the automotive industry. The plastics substrates involved are polar plastics, such as polycarbonate, polyamide, polystyrene, styrene copolymers, polyesters, polyphenylene oxides and blends of these types, reactive resins, e.g. PUR-RIM, SMC, BMC and the like. They may also be polyolefin substrates of the polyethylene and polypropylene type, if these have a relatively high rubber content, such as the PP-EPDM known under the tradename Keltan TP 0050 (manufacturer DSM) and also polyolefin grades which have been surface-activated by means, for example, of flame treatment or the like.

When coating metal substrates, attention must be paid as to whether they are intended for exterior or interior use. For exterior applications, for example in the case of metal substrates intended for the production of car bodies, it is most often necessary to use metals which have been given protection against corrosion by means of electrodeposition coating or some other method. When carrying out coating using the filler component according to the invention, the use of a filler can be dispensed with in this case, which is an enormous advantage. Where the metal substrates are intended for interior applications, for example for domestic appliances, the basecoat comprising the filler component can be applied directly to the bare metal.

The invention provides, additionally, a process for the coating of metal substrates which have been primed by means of electrodeposition coating, which process comprises applying to the electrodeposition-primed metal substrate the basecoat comprising the filler component, after short intermediate evaporation applying a basecoat which is free of filler components, after short evaporation applying a clearcoat over these basecoats and then curing the coats together, with heating. With regard to suitable basecoats which are free of filler components, to suitable clearcoats and to customary dry film thicknesses, reference is made to the comments above. The particular advantage of the processes according to the invention for the coating of metal substrates and, respectively, electrodeposition-primed metal substrates has its basis in the fact that it is possible to do without the application of a filler, which is normally applied prior to the application of the basecoat. The possibility of doing without the filler coat constitutes an enormous potential for savings and is therefore particularly advantageous for economic and ecological reasons.

The advantage of the processes according to the invention is, in particular, that it is possible to dispense with the prior priming, or precoating in the case of plastics substrates, which is usually necessary, and if appropriate with priming, but in any case with the application of filler coats which are normally necessary. The addition of the filler component according to the invention to a customary basecoat system achieves outstanding adhesion and at the same time gives excellent coverage of the customary substrate defects, such as grooves, flow lines and pores. The subsequent coating with a basecoat which is free of filler components achieves outstanding weathering stability and accuracy of shade of the coatings obtained. The use of the filler component is responsible for the high technological level of the overall system, with respect to stone-chip resistance for example. The presence of color pigments and/or effect pigments of the desired shade in the very first, modified basecoat makes it possible to overpaint with a very thin final basecoat. The application of all the coats of paint is customarily carried out by pneumatic spraying. If electrically conductive pigments are used in the filler component according to the invention when coating plastics, and in general when coating metallic substrates, electrostatic application of the subsequent coats is possible.

The present invention likewise provides for the use of the filler component in basecoats for the primerless coating of metal and plastics substrates and for the use of the filler component in basecoats for the coating of metal substrates primed by means of electrodeposition coating.

The invention is illustrated in more detail below with reference to working examples, wherein parts are by weight unless stated otherwise.

Preparation of a light-colored filler component according to the invention (pigment paste A1):

65% polyurethane dispersion (commercial product Daotan VTW 1225 from Hoechst) and 25% titanium dioxide (commercial product Titan Rutil R 900) are treated in a dissolver for 15 min and then milled for 45 min at max. 50° C. in a bead mill to a particle fineness of <15 μm. The millbase is diluted with 5% butylglycol and 5% water.

Preparation of a dark, conductive filler component according to the invention (filler component A2):

The procedure is similar to the preparation of the light-colored pigment paste A1, with the difference that, instead of 25% titanium dioxide, 10% titanium dioxide and 8% conductive carbon black (commercial product Ketjen Black from AKZO) are incorporated by milling.

Preparation of a light-colored filler component according to the invention (pigment paste A3):

The procedure is similar to the preparation of the light-colored pigment paste A1, with the difference that, instead of 65% of the polyurethane dispersion Daotan VTW 1225 ,55% of this dispersion and 10% of a melamine resin solution (commercial product Cymel 327) are used.

Preparation of a modified basecoat B1 according to the invention:

70% of an aqueous metallic basecoat (FW95 series from BASF Lacke+Farben AG) are mixed with 30% of the filler component A1, while stirring, and adjusted with deionized water to a spray viscosity of 20 DIN 4 seconds.

Preparation of a modified basecoat B2 according to the invention:

The procedure is as for the preparation of the modified basecoat B1, with the difference that the filler component A2 is used instead of the filler component A1.

Preparation of a modified basecoat B3 according to the invention:

The procedure is as for the preparation of the modified basecoat B1, with the difference that the filler component A3 is employed instead of the filler component A1.

EXAMPLE 1

Pneumatic coating of plastic parts

Panels or add-on components made from polycarbonate blends are washed with isopropanol and dried. The basecoat B1described above is applied with a flow-cup gun (spray pressure: 4–5 bar, 1.3 mm nozzle) in one cross-pass. The dry film thickness achieved in this application is from 12 to 17 μm. After evaporation at spraybooth temperature for about 2 to 3 min, the unmodified basecoat is applied in a further cross-pass. The dry film thickness of the unmodified basecoat is from about 7 to 10 μm. Evaporation is carried out at room temperature for 5 min, followed by forced flashing off at 60–80° C. for 10 minutes. After cooling to room temperature, a commercial, polyacrylate-based, two-component polyurethane clearcoat (commercial product GP 71-0109 from BASF Lacke+Farben AG) is applied, following the evaporation procedure, in 2 cross-passes with the same spraying parameters, resulting in a dry film thickness of from 25 to 35 μm. The coated plastic part is left to evaporate for a further 10 to 15 minutes and then dried in a convection oven at 90° C. for 30 min.

EXAMPLE 2

Electrostatic coating of plastics parts

The application of the two basecoats is carried out similarly to Example 1 using the basecoat B2 as basecoat modified with filler components. The clearcoat used in Example 1 is then applied, after the part has been grounded, by means of electrostatically assisted pneumatic guns or by way of a high-speed rotating bell.

EXAMPLE 3

Pneumatic coating of metal parts

Panels or shaped bodies of phosphatized steel (Bonder 26 from Chemetall) are washed with isopropanol, dried and then coated as described in Example 1, using the basecoat B3 as basecoat comprising filler components, and then using the corresponding, unmodified basecoat, i.e. the basecoat free of filler components. After allowing the two basecoats to evaporate, a commercial, autocrosslinking clearcoat based on acrylic resin (commercial product FF 92-0102 from BASF Lacke+Farben AG) is applied—as described in Example 1—in 2 cross-passes using the same spraying parameters, to give a dry film thickness of from 25 to 35 μm. The finished coated metal part is allowed a further time for evaporation of 5 minutes and then dried in a convection oven at 130° C. for 20 minutes.

Technological tests:

The coated parts are aged at room temperature for 7 days and subjected to forced aging at 60° C. for 24 h. The following test results are obtained in Examples 1, 2 and 3:

Crosshatch with adhesive-tape tear-off (DIN 53 151): value 0

VW steam jet test: satisfactory (no flaking)

VW stone chipping: 0 (no flaking)

Blistering after 240 h constant climatic conditions: mogo/gt likewise 0

We claim:

1. A process for applying a composite coating to a substrate, comprising the steps of:
   (a) preparing a filler component, comprising:
      (i) from 10 to 70% by weight of an aqueous polyurethane dispersion, wherein the dispersion is from 10 to 60% by weight polyurethane resin and
      (ii) from 5 to 40% by weight of at least one filler;
   (b) preparing a filler-basecoat composition, comprising from 10 to 70% by weight of said filler component and from 90 to 30% by weight of a portion of an aqueous basecoat composition;
   (c) applying said filler-basecoat in a first layer on the substrate;
   (d) applying said aqueous basecoat composition in a second layer;
   (d) applying a clearcoat in a third layer;
   (e) curing the coating layers together.

2. A process according to claim 1, wherein said substrate comprises a material selected from the group consisting of plastic materials and metals.

3. A process according to claim 2, wherein said substrate comprises a plastic selected from the group consisting of polyolefins, polycarbonates, polyamides, polystyrenes, styrene copolymers, polyesters, polyphenylene oxides, PUR-RIM, SMC, BMC, and mixtures thereof.

4. A process according to claim 1, wherein said substrate comprises a metal material having thereon an electrodeposition primer.

5. A process according to claim 1, wherein said filler component comprises from 40 to 55% by weight of said aqueous polyurethane dispersion.

6. A process according to claim 1, wherein said aqueous polyurethane dispersion comprises from 20 to 50% by weight of said polyurethane resin.

7. A process according to claim 1, wherein said filler component comprises from 10 to 30% by weight of said filler.

8. A process according to claim 1, wherein at least a portion of said filler of said filler component is selected from the group consisting of silicate fillers, mica fillers, carbonate fillers, sulfate fillers, and mixtures thereof.

9. A process according to claim 1, wherein said polyurethane resin of said filler component comprises a physically drying resin.

10. A process according to claim 1, wherein said filler component further comprises a crosslinking component in an amount of up to 30% by weight of said filler component.

11. A process according to claim 10, wherein said polyurethane resin of said filler component has an hydroxyl number of from 50 to 500 mg KOH/g and further wherein said crosslinking component is selected from the group consisting of amino resins, blocked polyisocyanates, and mixtures thereof.

12. A process according to claim 11, wherein said polyurethane resin has an hydroxyl number of from 100 to 350 mg KOH/g.

13. A process according to claim 1, wherein said filler component further comprises a physically drying, water-dilutable binder that is different from the polyurethane resin, in an amount of up to 50% by weight of said filler component.

14. A process according to claim 13, wherein said physically drying, water-dilutable binder is present in an amount of up to 10% by weight of said filler component.

15. A process according to claims 13, wherein said physically drying, water-dilutable binder is selected from the group consisting of polyester resins, alkyd resins, polyacrylate resins, cellulose derivatives, melamine resins, and mixtures thereof.

16. A process according to claim 1, wherein said filler component further comprises a pigment selected from the group consisting of color pigments, effect pigments, and mixtures thereof, and said pigment is present in an amount of up to 30% by weight of said filler component.

17. A process according to claim 1, wherein said filler component further comprises at least one rheological additive in an amount of up to 5% by weight of said filler component.

18. A process according to claim 17, wherein said rheological additive is selected from the group consisting of waxes, associated thickeners, phyllosilicates, organically modified minerals, and mixtures thereof.

19. A process according to claim 1, wherein said filler component further comprises 3 to 10% by weight of at least one organic solvent, based on the weight of said filler component.

20. A process according to claim 1, wherein said filler component comprises from 40 to 55% by weight of said aqueous polyurethane dispersion and from 10 to 30% by weight of said filler; and wherein the filler component further comprises up to 30% by weight of a crosslinking component, up to 10% by weight of a physically drying, water-dilutable binder that is different from the polyurethane resin, from 5 to 20% by weight of at least one pigment selected from the group consisting of color pigments, effect pigments, and mixtures thereof, from 0.5 to 2% by weight of at least one rheological additive, and from 3 to 10% by weight of organic solvent, based on the weight of said filler component.

21. A coated article prepared according to the process of claim 1.

* * * * *